US005864184A

United States Patent [19]

Platner et al.

[11] Patent Number: 5,864,184

[45] Date of Patent: Jan. 26, 1999

[54] INTERFACE CIRCUITRY FOR FACILITATING INSTALLATION OF A CONTROL DEVICE

[75] Inventors: Brian Page Platner, 100 Trailwood Dr., Guilford, Conn. 06437; Philip Howland Mudge, Brookfield; Keith Kendell Platner, Northford, both of Conn.

[73] Assignee: Brian Page Platner, Guilford, Conn.

[21] Appl. No.: 811,591

[22] Filed: Mar. 5, 1997

[51] Int. Cl.[6] ........ H02J 3/14

[52] U.S. Cl. ........ 307/31; 307/117; 340/541

[58] Field of Search ........ 307/31, 24, 116, 307/117, 29, 30; 327/260; 337/105; 340/565, 541; 439/607; 361/100

[56] References Cited

U.S. PATENT DOCUMENTS

| | | | |
|---|---|---|---|
| 3,855,482 | 12/1974 | Wills | 327/459 |
| 4,060,123 | 11/1977 | Hoffman et al. | 165/11.1 |
| 4,169,982 | 10/1979 | Rittman | 307/116 |
| 4,340,826 | 7/1982 | Muchnick | 307/157 |
| 4,346,427 | 8/1982 | Blissett et al. | 361/173 |
| 4,365,167 | 12/1982 | Weimer et al. | 307/117 |
| 4,527,216 | 7/1985 | Stammely | 361/156 |
| 4,618,770 | 10/1986 | Maile | 250/338.1 |
| 4,716,359 | 12/1987 | Numata et al. | 323/281 |
| 4,874,962 | 10/1989 | Hermans | 250/342 |
| 5,146,386 | 9/1992 | Learned | 361/100 |
| 5,151,840 | 9/1992 | Siefken | 361/13 |
| 5,175,487 | 12/1992 | Inoue | 323/276 |
| 5,534,850 | 7/1996 | Lee | 307/117 |
| 5,623,172 | 4/1997 | Zaretsky | 307/117 |
| 5,639,262 | 6/1997 | Lim | 439/607 |
| B1 4,874,962 | 4/1995 | Hermans | 307/116 |

*Primary Examiner*—Jeffrey A. Gaffin
*Assistant Examiner*—Albert W. Paladini
*Attorney, Agent, or Firm*—Thomas L. Secrest; Christopher J. Harnett; Garry J. Tuma

[57] ABSTRACT

Interface circuitry for facilitating the installation of a control device is presented. One embodiment includes an interface circuit with first and second terminals that can be coupled interchangeably to a load and the utility hot of an AC power source, thus eliminating the time-consuming requirement that a particular wire be coupled to a particular terminal. The interface circuit also limits the amount of current supplied to the control device during periods of low current demand, thus reducing current and power consumption. An additional feature further facilitates installation of a control device when that device is being installed in a metallic electrical enclosure that is itself coupled to utility return. The device's return terminal is automatically coupled to the power source's utility return upon mounting of the control device in the enclosure.

27 Claims, 3 Drawing Sheets

INTERFACE CIRCUITRY FOR FACILITATING INSTALLATION OF A CONTROL DEVICE

BACKGROUND OF THE INVENTION

This invention relates to the electrical installation of control devices. More particularly, this invention relates to interface circuitry for facilitating the installation of a control device in a commercial, industrial, or home electrical environment.

Such electrical environments are typically powered by an alternating current (AC) power source which, by convention, delivers current through a utility hot and a utility return. The current alternates between positive and negative values typically 60 times a second (i.e., 60 hertz). If either the hot or return is electrically disconnected, current will not flow. By convention, the hot conductor is used to switch an electrical load, such as room lighting, on and off, while the utility return is maintained intact. The utility return is made up of two redundant conductors called neutral and equipment ground. These two conductors are by convention electrically coupled at the power source or at the main circuit breaker panel. Throughout the wiring of an AC system, both the hot and utility return conductors are physically adjacent each other for safety reasons.

A third utility path known as an isolated earth ground is sometimes provided. This third path is an isolated conductor between the electrical point of use (e.g., an electrical outlet) and the physical earth ground. The isolated earth ground conductor is not electrically connected to either the utility hot or utility return.

When installing a control device (for example, an occupancy detector) in place of a traditional toggle switch, by convention three conductors are accessible—a hot, a load, and a utility return—requiring three separate connections to be made. In many cases, it is not possible to safely determine the hot from the load. For example, the conductors may not be color coded, or they may be coded incorrectly or contrary to local custom. The possibility of an incorrect installation is thus undesirably high.

To check for an incorrect installation, the device should be tested after it is installed. However, testing can be very time consuming; many control devices, such as the previously mentioned occupancy detector, have built-in time delays. Furthermore, testing at the time of installation may not always be possible, because, for example, the power may be off or particular testing equipment may not be available. It is therefore likely that either the device will not be tested at all or installation costs will be higher. Moreover, if the device fails to function, it could be assumed to be defective when it may only be incorrectly wired, thus resulting in a perfectly good device being wasted. To prevent such waste, the device should therefore be removed, rewired, and retested. However, this activity further increases installation time and costs.

In addition, many known control devices do not advantageously limit the amount of current supplied by the power source during periods of low current demand. For example, current demand in an occupancy detector is at a minimum when the detector monitors an unoccupied area (i.e., the load is off and the detector is essentially in a stand-by mode). Any resulting current undesirably increases power consumption and accordingly the electrical costs of operating the device. Such costs can become significant in applications where hundreds of control devices are deployed, such as, for example, in large industrial complexes. Limiting the current supplied during low demand periods reduces power consumption and results in more economical operation of the device.

In view of the foregoing, it would be desirable to provide interface circuitry that facilitates the installation of a control device by eliminating the need to determine which conductor is the load and which is the hot.

It would also be desirable to provide interface circuitry that reduces the cost of operating a control device by selectively limiting the amount of current supplied to the device by the power source.

It would further be desirable to provide interface circuitry that reduces the number of conductors that must be coupled during installation of a control device.

SUMMARY OF THE INVENTION

It is an object of this invention to provide interface circuitry that facilitates the installation of a control device by eliminating the need to determine which conductor is the load and which is the hot.

It is also an object of this invention to provide interface circuitry that reduces the cost of operating a control device by selectively limiting the amount of current supplied to the device by the power source.

It is a further object of this invention to provide interface circuitry that reduces the number of conductors that must be coupled during installation of a control device.

In accordance with this invention, there is provided an interface circuit for coupling a control device to a load and an AC power source. The control device has a return terminal for coupling to the utility return of the power source. The interface circuit has first and second terminals that can be coupled interchangeably to a load and the utility hot of the power source to facilitate installation. The interface circuit also has a third terminal for coupling to the control device and switching circuitry that selectively limits the amount of current supplied to the control device during low current conditions, thus reducing current and power consumption.

A control device that incorporates the interface circuit in a single package is also provided. Additionally, a control device incorporating the interface circuit is provided that further includes a conductive strap that eliminates the separate step of coupling the return terminal to the utility return.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention provides interface circuitry for facilitating the electrical installation of a device that controls the on-off operation of a load, such as, for example, office lighting. The typical electrical environment in which the interface circuit is installed includes an AC power source that by convention delivers alternating current through a utility hot and a utility return. The utility return ordinarily includes two redundant conductors, a neutral and an equipment ground, that are by convention coupled together at either the power source or the main circuit breaker panel.

A first embodiment interface circuit enables an installation technician to correctly wire a control device to a load and a power source by permitting the load and hot conductor wires to be coupled interchangeably to first and second terminals of the interface circuit. The interface circuit has switching circuitry responsive to the control device that enables the control device to selectively limit the amount of current supplied to it by the power source during low current demand conditions, thus reducing current and power consumption.

Figure 1:
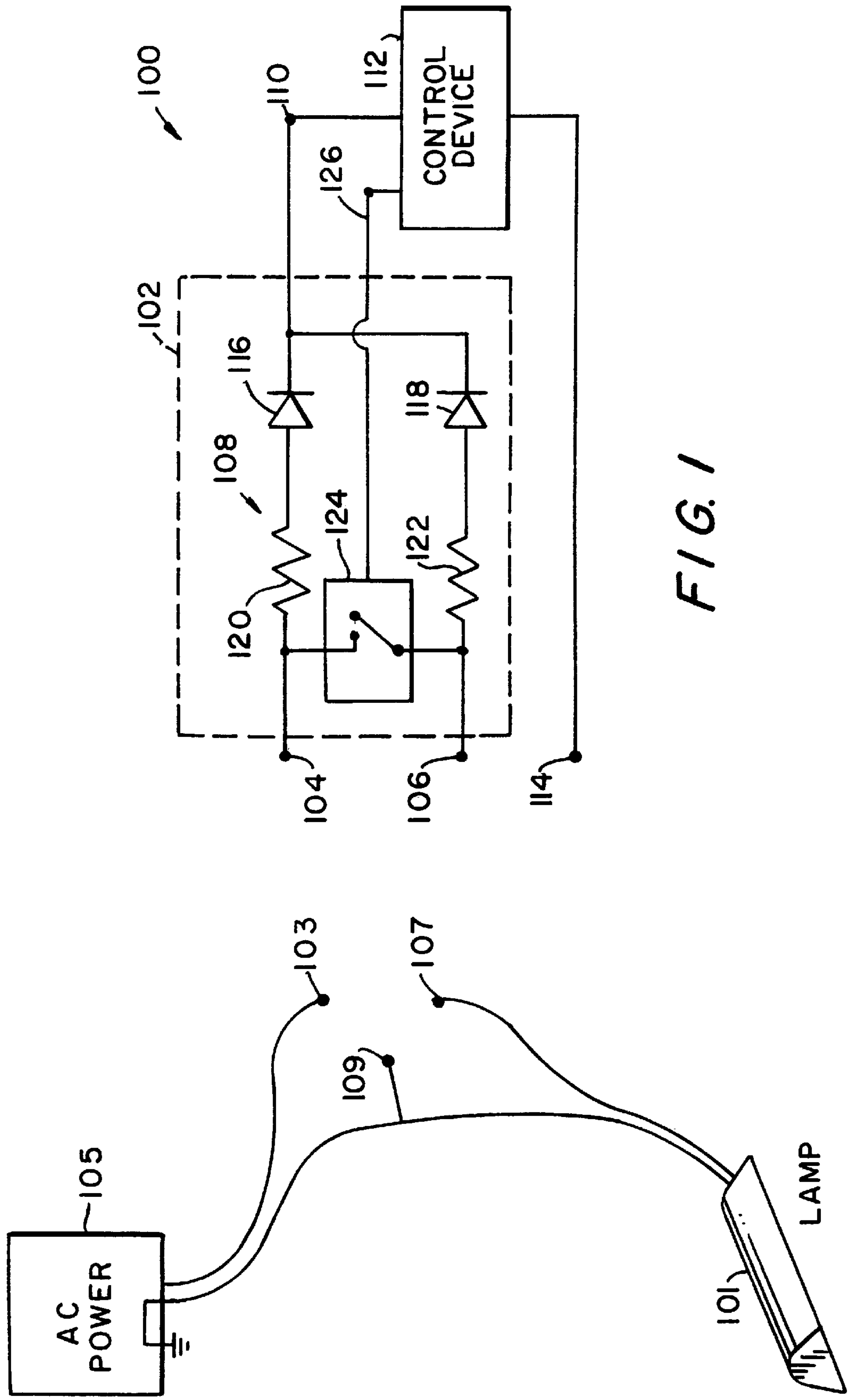
FIG. 1 is a schematic block diagram of a first embodiment of an interface circuit according to the present invention.

FIG. 1 shows first embodiment 100 according to the present invention. Interface circuit 102 includes first and second terminals 104 and 106 for coupling interchangeably to load 101 and utility hot 103 AC power source 105. Interface circuit 102 also includes switching circuitry 108 for controlling current flow and a third terminal 110 for coupling current to a control device 112. Control device 112 can be, for example, an occupancy detector, such as the Decorator Wall Switch Sensor manufactured by Sensor Switch Incorporated, of Wallingford, Conn.

First and second terminals 104 and 106 can be coupled to either load and hot conductors 107 and 103, respectively, or hot and load conductors 103 and 107, respectively. Such interchangeability advantageously facilitates the installation process by ensuring that the device will be wired correctly regardless of which conductor (hot or load) is coupled to which terminal (first or second). The installation technician no longer has to determine (or more likely guess) which conductor is hot and which is load. Furthermore, such interchangeability eliminates the need to test the control device for proper connection after the device is installed, thus reducing installation time and costs. Still further, such interchangeability eliminates the need to color code conductor wires (e.g., black for load and red for hot).

Control device 112 includes a return terminal 114 for coupling to utility return 109 of power source 105. Unlike other known control devices, control device 112 does not require a connection to an isolated earth ground for operation. An isolated earth ground is an isolated conductor between a point of use and the physical earth ground. The isolated ground conductor is not electrically connected to either the utility hot or utility return. A device such as control device 112 is preferable because an isolated ground connection, commonly designated by an orange triangle, is not usually available at the point of installation.

Switching circuitry 108 comprises two parallel paths, each including current limiting means, shown as resistors 120 and 122, and rectifying means, shown as diodes 116 and 118. Diodes 116 and 118, as shown in FIG. 1, permit conduction from AC power source 105 to control device 112 during the positive portion of the AC cycle, and prevent conduction from control device 112 to AC power source 105 during the negative portion of the AC cycle. Note that the order of the series combination of current limiting means and rectifying means can be reversed. That is, switching circuitry 108 can function properly whether, for example, the component order between first terminal 104 and third terminal 110 is resistor 120 followed by diode 116 (as shown in FIG. 1) or diode 116 followed by resistor 120. Note further that because of the alternating nature of the supplied power, the directional orientation of the rectifying means can also be reversed, provided that both rectifying means are identically oriented with respect to third terminal 110.

A switch 124 provides a path between first and second terminals 104 and 106. Switch 124 is preferably controlled electronically by control device 112 through control line 126 and is preferably a latching relay. Switch 124 can also be any component (e.g., an AC semiconductor switch) capable of being controlled by an electronic signal and of conducting an amount of current sufficient to power the load and control device 112.

Interface circuit 102 preferably operates as follows: assume first terminal 104 is coupled to hot and second terminal 106 is coupled to load. Switch 124 is initially open, corresponding to a first condition determined by the control device. For example, if the control device were an occupancy detector, a first condition would occur when a monitored area is unoccupied. During such a first condition, current supplied by the power source flows through first terminal 104, resistor 120, and diode 116 to control device 112. Current does not flow to the load because switch 124, located between hot and load, is open.

The occurrence of a second condition, which, in the case of the occupancy detector, occurs when a person is detected in the monitored area, results in a signal being generated by control device 112 that closes switch 124 via control line 126. Current now flows to the load via the path from first terminal 104 (hot), through switch 124, to second terminal 106 (load). Moreover, increased current to control device 112, required because of the increased circuit activity of control device 112, now flows through a secondary path provided by first terminal 104, switch 124, resistor 122, and diode 118.

If the connections to first and second terminals 104 and 106 were interchanged, that is, first terminal 104 were coupled to load and second terminal 106 were coupled to hot, operation of interface circuit 102 would be as described above except that second terminal 106 would be substituted in the description for first terminal 104 and first terminal 104 would be substituted in the description for second terminal 106.

Interface circuit 102 enables a control device to operate more economically by reducing the current supplied to it (and thus the power consumption) during periods of low current demand, such as the occurrence of the first condition described above. The ohmic value of resistors 120 and 122 can be selected to accommodate the current requirements of a particular control device and load.

Figure 2:
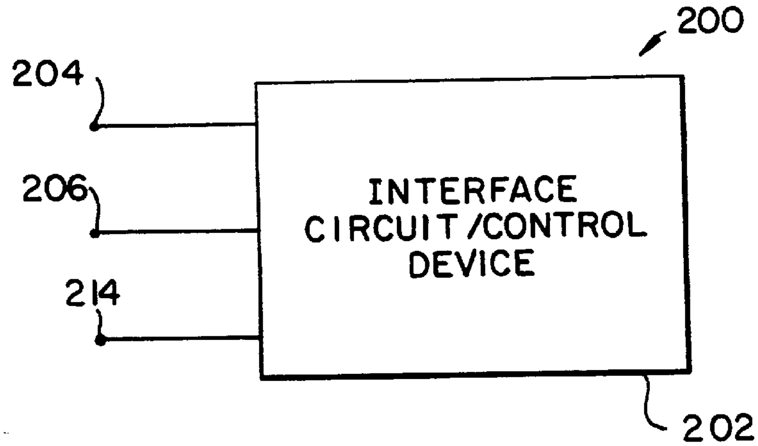
FIG. 2 is a representational block diagram of a second embodiment of a control device incorporated with the interface circuit of FIG. 1 according to the present invention.

FIG. 2 shows a second embodiment 200 according to the present invention. Second embodiment 200 incorporates interface circuit 102 and control device 112 into a single package, shown simply as device 202. Device 202 has first and second terminals 204 and 206 for coupling interchangeably to load and hot, and return terminal 214 for coupling to the AC power source's utility return. Advantageously, device 202 does not require a connection to an isolated earth ground, which is not always available. The operation and advantages of device 202 are similar to those described above for first embodiment 100.

A third embodiment 300 according to the present invention provides an additional interfacing feature that further facilitates the installation of a control device when the control device is installed in a metallic electrical enclosure that is itself coupled to utility return. A conductive strap is coupled to the return terminal of either a control device or a control device incorporating interface circuit 102. The conductive strap is in alignment with at least one mounting fastener of the control device. When the control device is mounted to the grounded enclosure, the return terminal becomes automatically coupled to the power source's utility return. Thus the need to separately couple the return terminal to the utility return conductor is eliminated.

Figure 3:
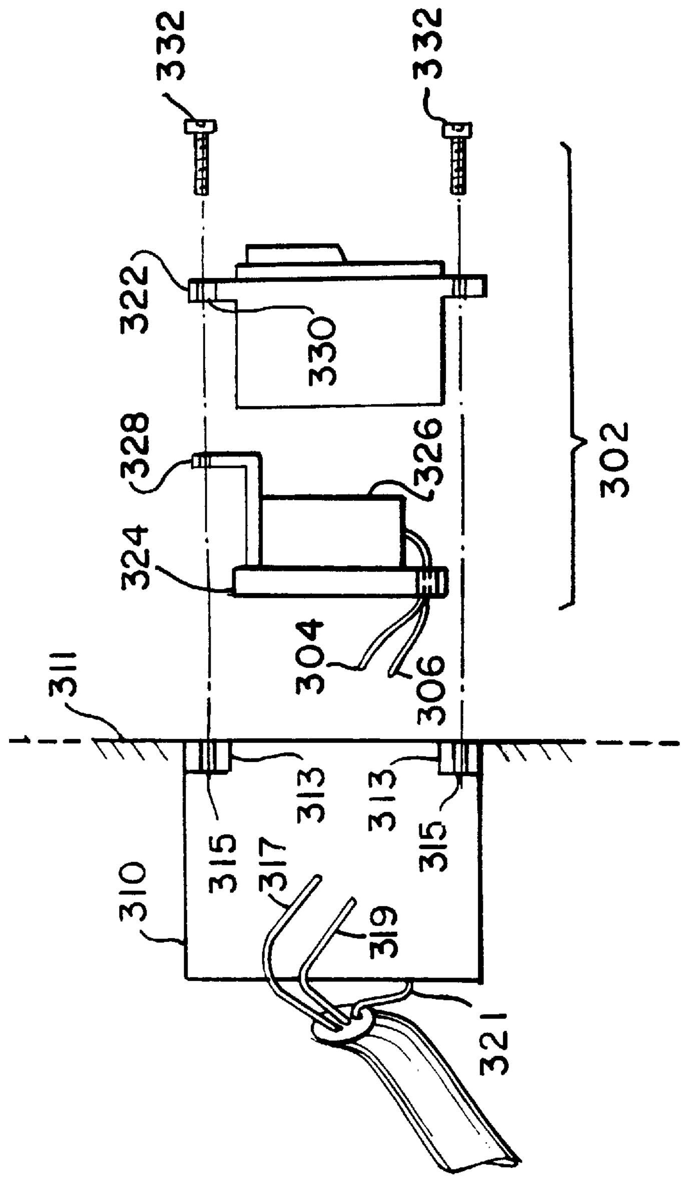
FIG. 3 is an exploded side view of a third embodiment of a control device incorporated with the interface circuit of FIG. 1 according to the present invention.

FIG. 3 illustrates the conductive strap coupled to a return terminal in a control device package containing both interface circuit 102 and control device circuitry. A metallic electrical enclosure 310 is mounted within a wall or ceiling surface 311 and typically has tabs 313 with tapped holes 315 for mounting electrical devices thereto. Hot and load conductors 317 and 319 are typically available inside enclosure 310, which is coupled to the power source's utility return via, for example, electrical contact with utility return conductor 321.

Control device 302 preferably has front and back covers 322 and 324 which can be assembled in any conventional manner, such as, for example, with screws inserted through back cover 324 and secured to front cover 322 through threaded holes (not shown). Control device 302 also has first and second terminals 304 and 306, similar to first embodiment terminals 104 and 106 and second embodiment terminals 204 and 206, which can be coupled interchangeably to hot and load conductors 317 and 319. Mounted preferably on back cover 324 is integrated circuitry 326, which contains control circuitry and interface circuit 102.

Integrated circuitry 326 further includes a conductive strap 328 which is coupled to the integrated circuitry's return terminal (not shown). Coupling can be accomplished in any conventional manner, such as, for example, by soldering. Conductive strap 328 preferably extends from integrated circuitry 326 in alignment with mounting hole 330 and is preferably shaped to fit within front cover 322 when control device 302 is assembled. Conductive strap 328, an embodiment of which is shown in more detail in FIGS. 4A—C, preferably has one or more preformed openings (e.g., holes, slots, or both) for receiving there through one or more fasteners 332 (preferably screws) that mount control device 302 to enclosure 310.

As control device 302 is mounted in enclosure 310 with fasteners 332, conductive strap 328 is automatically brought in electrical contact with a tab 315 of enclosure 310, thus resulting in the coupling of the return terminal of control device 302 to utility return. This feature eliminates the need to separately couple the return terminal to utility return, thus further facilitating installation.

Figure 4A:
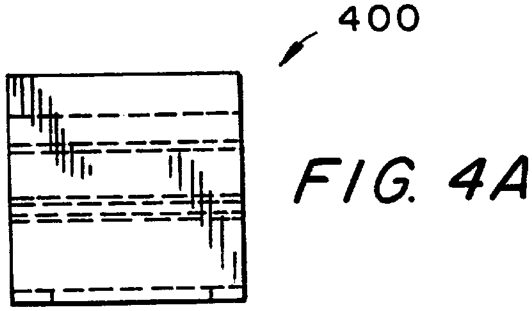
FIGS. 4A–C are plan, front, and side views of an embodiment of the conductive strap of FIG. 3 according to the present invention.
Figure 4B:
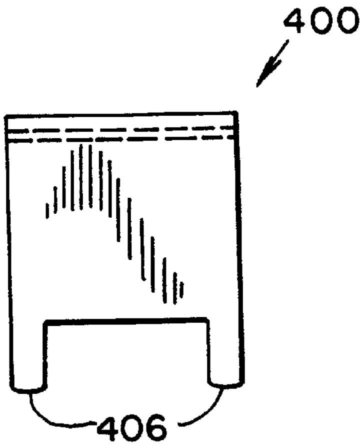
Figure 4C:
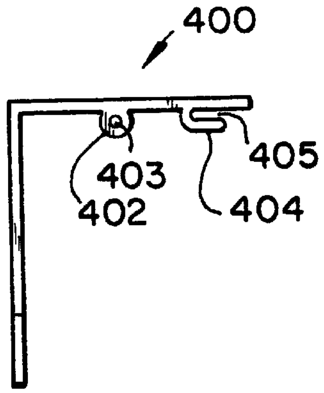

Referring to FIGS. 4A—C, one embodiment of conductive strap 328 is shown as a generally L-shaped flexibly rigid bracket 400 with preferably rolled portions 402 and 404 that form hole 403 and slot 405, respectively. Additional or alternative holes and slots can be formed substantially anywhere on bracket 400 to provide alignment with one or more particular mounting fasteners of the control device. Note that while bracket 400 is shown as generally L-shaped, conductive strap 328 can be shaped and dimensioned to fit within a wide variety of differently configured control device covers and still be in alignment with one or more mounting fasteners. Strap tabs 406 are optionally provided to facilitate coupling to, for example, a printed circuit board containing integrated circuitry 326. Strap tabs 406 can be shaped, dimensioned, and formed in any number, if needed at all, to accommodate substantially any particular manner of coupling to a control device's return terminal. Conductive strap 328 can be of any conductive material suitable for electrical grounding.

Accordingly, complete and proper installation of control device 302 involves merely coupling terminals 304 and 306 to conductors 317 and 319, regardless of which terminal is coupled to which conductor, and then simply mounting control device 302 to enclosure 310, which automatically couples the device to utility return. The installation technician no longer has to check for proper wiring of hot and load, and no longer has to additionally couple the return terminal to the utility return conductor, saving both installation time and costs.

Thus it is seen that interface circuitry is provided for facilitating the installation of a control device by permitting interchangeable coupling of hot and load to the device. It is also seen that interface circuitry is provided for reducing the electrical costs of operating control devices by limiting current flow in response to low current conditions as determined by the control device. And it is further seen that interface circuitry is provided for further facilitating the installation of a control device that is being installed in a grounded metallic enclosure by providing a conductive strap that couples the device's return terminal to utility return automatically upon mounting of the device to the grounded enclosure.

One skilled in the art will appreciate that the present invention can be practiced by other than the described embodiments, which are presented for purposes of illustration and not of limitation, and the present invention is limited only by the claims which follow.

We claim:

1. An interface circuit for coupling a control device to a load and a power source, said power source having a utility hot and a utility return, said load and said control device being coupled to said utility return, said control device not requiring an earth ground connection, said circuit comprising:

first and second terminals for coupling interchangeably to said load and said hot;

a third terminal for coupling current to said control device;

a fourth terminal for receiving a control signal from said control device: and switching circuitry coupled to said first, second, third, and fourth terminals for varying the amount of current supplied to said control device and to said load in response to said control signal.

2. The circuit of claim 1 wherein said switching circuitry limits the amount of said current supplied to said control device during low current demand conditions.

3. The circuit of claim 1 wherein said switching circuitry comprises:

a first current limiting means;

a first rectifying means coupled in series with said first current limiting means;

a second current limiting means;

a second rectifying means coupled in series with said second current limiting means; and a switch coupled between said first and second terminals, said switch being controlled by said control device; wherein:

the series combination of said first current limiting means and said first rectifying means is coupled to said first terminal and to said third terminal;

the series combination of said second current limiting means and said second rectifying means is coupled to said second terminal and to said third terminal; and the directional orientation of said first rectifying means and of said second rectifying means with respect to said third terminal is identical.

4. The circuit of claim 1 wherein said control device comprises an occupancy detector.

5. The circuit of claim 1 wherein said switching circuitry comprises a first rectifying means coupled between said first terminal and said third terminal.

6. The circuit of claim 5 wherein said first rectifying means comprises a diode.

7. The circuit of claim 1 wherein said switching circuitry comprises a second rectifying means coupled between said second terminal and said third terminal.

8. The circuit of claim 7 wherein said second rectifying means comprises a diode.

9. The circuit of claim 1 wherein said switching circuitry comprises a switch coupled between said first and second terminals.

10. The circuit of claim 9 wherein said switch is controlled by said control device.

11. The circuit of claim 9 wherein said switch comprises a latching relay.

12. A control device for controlling the on-off operation of a load, said control device being coupled to a power source, said power source having a utility hot and a utility return, said load being coupled to said utility return, said control device comprising:

control circuitry for controlling the on-off operation of said load;

first and second terminals for coupling interchangeably to said load and said hot;

a return terminal for coupling to said utility return, an earth ground connection not being required, said return terminal being coupled to said control circuitry; and an interface circuit coupled to said control circuitry and to said first and second terminals, said interface circuit comprising:

switching circuitry coupled to said control circuitry and to said first and second terminals for controlling the amount of current supplied from said power source to said control circuitry and to said load in response to said control circuitry.

13. The control device of claim 12 wherein said switching circuitry limits the amount of current supplied to said control circuitry during low current demand conditions.

14. The control device of claim 12 wherein said switching circuitry comprises:

a first current limiting means;

a first rectifying means coupled in series with said first current limiting means;

a second current limiting means;

a second rectifying means coupled in series with said second current limiting means; and a switch coupled between said first and second terminals, said switch being controlled by said control circuitry; wherein:

the series combination of said first current limiting means and said first rectifying means is coupled to said first terminal and to said third terminal;

the series combination of said second current limiting means and said second rectifying means is coupled to said second terminal and to said third terminal; and the directional orientation of said first rectifying means and of said second rectifying means with respect to said third terminal is identical.

15. The control device of claim 12 wherein said device is to be installed in a metallic electrical enclosure that is coupled to said utility return, said device further comprising:

a plurality of fasteners for mounting said device in said enclosure; and a conductive strap coupled to said return terminal and in alignment with at least one of said plurality of fasteners; wherein:

mounting of said device in said enclosure with said at least one fastener couples said return terminal to said utility return.

16. The control device of claim 15 wherein said conductive strap comprises a flexibly rigid generally L-shaped bracket of conductive material having at least one preformed opening for receiving there through said at least one fastener.

17. A control device for controlling the on-off operation of a load, said control device to be coupled between a power source and said load, said power source having a utility hot and a utility return, said load being coupled to said utility return, said control device to be installed in a metallic electrical enclosure that is coupled to said utility return, said control device comprising:

control circuitry for controlling the on-off operation of said load;

first and second terminals for coupling respectively to said load and said hot, said first and second terminals being coupled to said control circuitry:

a return terminal for coupling to said utility return, an earth ground connection not being required, said return terminal being coupled to said control circuitry;

a plurality of fasteners for mounting said control device in said enclosure; and a conductive strap coupled to said return terminal and in alignment with at least one of said plurality of fasteners; wherein:

mounting of said control device in said enclosure with said at least one fastener couples said return terminal to said utility return.

18. A method of facilitating the installation of a control device, said control device having a return terminal and first and second terminals, said first and second terminals for coupling interchangeably to a load and the utility hot of a power source, said power source having a utility return, said load being coupled to said utility return, said method comprising:

coupling said load to one of said first and second terminals;

coupling said hot to the other one of said first and second terminals; and coupling said return terminal to said utility return, an earth ground connection not being required.

19. A method of facilitating the installation of a control device in a metallic electrical enclosure that is coupled to an AC power source's utility return, said control device comprising a return terminal and first and second terminals, said first and second terminals for coupling interchangeably to a load and the utility hot of said power source, said load being coupled to said utility return, said device further comprising a plurality of fasteners and a conductive strap that is coupled to said return terminal and in alignment with one of said plurality of fasteners, said method comprising:

coupling said load to one of said first and second terminals;

coupling said hot to the other one of said first and second terminals; and mounting said device in said enclosure with said plurality of fasteners, wherein said strap becomes electrically coupled to said utility return upon said mounting.

20. A method of facilitating the installation of a control device in a metallic electrical enclosure that is coupled to an AC power source's utility return, said control device comprising a return terminal and first and second terminals, said first and second terminals for coupling to a load and the utility hot of said power source, respectively, said load being coupled to said utility return, said device further comprising a plurality of fasteners and a conductive strap that is coupled to said return terminal and in alignment with one of said plurality of fasteners, said method comprising:

coupling said load to said first terminal;

coupling said hot to said second terminal; and mounting said device in said enclosure with said plurality of fasteners, wherein said strap becomes electrically coupled to said utility return upon said mounting.

21. A method of limiting the current available to a control device, said control device being coupled to an interface circuit and the utility return of an AC power source, an earth ground connection not being required, said interface circuit being coupled to a load and the utility hot of said power source, said load being coupled to said utility return, said method comprising:

supplying a reduced amount of current to said control device in response to a first condition determined by said control device; and supplying an increased amount of current to said control device in response to a second condition determined by said control device.

22. The method of claim 21 further comprising supplying current to said load in response to said second condition.

23. The method of claim 21 wherein said control device comprises an occupancy detector and said first condition corresponds to a monitored area that is unoccupied.

24. The method of claim 21 wherein said control device comprises an occupancy detector and said second condition corresponds to a monitored area that is occupied.

25. A method of simultaneously controlling current to both a control device and a load, said control device and said load being coupled to the utility return of an AC power source, said method comprising:

coupling an interface circuit to said control device, said load, and the utility hot of said power source;

opening a switch in said interface circuit to prevent said load from receiving current;

supplying a first current to said control device;

closing said switch in response to a signal received from said control device;

supplying a second current to said load; and supplying a third current to said control device.

26. The method of claim 25 wherein said control device comprises an occupancy detector and said supplying a first current to said control device further comprises:

monitoring a defined area for the presence of a person; and generating a signal indicating the presence of a person within said defined area.

27. The method of claim 25 wherein said third current is larger than said first current.

* * * * *